(12) United States Patent
Christensen et al.

(10) Patent No.: US 10,090,566 B2
(45) Date of Patent: Oct. 2, 2018

(54) SOLID STATE BATTERY WITH OFFSET GEOMETRY

(71) Applicant: Robert Bosch GmbH, Stuttgart (DE)

(72) Inventors: John F. Christensen, Mountain View, CA (US); Bernd Schumann, Rutesheim (DE); Timm Lohmann, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 692 days.

(21) Appl. No.: 14/467,921

(22) Filed: Aug. 25, 2014

(65) Prior Publication Data

US 2015/0064506 A1 Mar. 5, 2015

Related U.S. Application Data (60) Provisional application No. 61/870,269, filed on Aug. 27, 2013.

(51) Int. Cl.
*H01M 10/42* (2006.01)
*H01M 10/0525* (2010.01)
(Continued)

(52) U.S. Cl.
CPC ......... *H01M 10/4257* (2013.01); *H01M 4/13* (2013.01); *H01M 10/058* (2013.01);
(Continued)

(58) Field of Classification Search
CPC ........... H01M 10/0525; H01M 10/058; H01M 10/4257; H01M 2010/4271;
(Continued)

(56) References Cited

U.S. PATENT DOCUMENTS

| 6,277,515 B1 * | 8/2001 | Akahira | H01M 10/0436 |
| | | | 429/123 |
| 2004/0038123 A1 * | 2/2004 | Hisamitsu | H01M 10/0413 |
| | | | 429/147 |

(Continued)

FOREIGN PATENT DOCUMENTS

WO 2012137053 A1 10/2012

OTHER PUBLICATIONS

International Search Report and Written Opinion corresponding to PCT Application No. PCT/US2014/052713, dated Dec. 10, 2014 (9 pages).
(Continued)

*Primary Examiner* — Lingwen R Zeng
(74) *Attorney, Agent, or Firm* — Maginot Moore & Beck LLP (57) ABSTRACT

In one embodiment, a solid state battery includes a first cell stack including a first solid-electrolyte separator positioned between a first cathode and a first anode, a first base layer including a first base portion positioned directly beneath the first anode, and including a first lateral extension extending laterally beyond the first anode, a second cell stack beneath the first base layer and including a second solid-electrolyte separator positioned between a second cathode and a second anode, a second base layer including a second base portion positioned directly beneath the second anode, and including a second lateral extension extending laterally beyond the second anode, wherein the second base portion extends laterally beyond the first lateral extension, and a multiplexor (i) in electrical communication with the first base portion through the first lateral extension, and (ii) in electrical communication with the second base portion through the second lateral extension.

11 Claims, 6 Drawing Sheets

(51) Int. Cl.
*H01M 4/13* (2010.01)
*H01M 10/058* (2010.01)
*H01M 10/0562* (2010.01)

(52) U.S. Cl.
CPC ... *H01M 10/0525* (2013.01); *H01M 10/0562* (2013.01); *H01M 2010/4271* (2013.01); *H01M 2300/0065* (2013.01); *Y02T 10/7011* (2013.01); *Y10T 29/49108* (2015.01)

(58) Field of Classification Search
CPC .......... H01M 2300/0065; H01M 4/13; H01M 10/0562; Y02E 60/122; Y02T 10/7011; Y10T 29/49108
See application file for complete search history.

(56) References Cited

U.S. PATENT DOCUMENTS

| | | | |
|---|---|---|---|
| 2005/0141170 A1 | 6/2005 | Honda et al. | |
| 2009/0269670 A1 | 10/2009 | Tsuchida | |
| 2011/0027634 A1* | 2/2011 | Kishimoto | H01M 2/206 429/90 |
| 2011/0101920 A1* | 5/2011 | Seo | H01M 10/486 320/127 |
| 2011/0123868 A1 | 5/2011 | Kawaoka et al. | |
| 2013/0149593 A1 | 6/2013 | Hayashi et al. | |
| 2013/0157143 A1 | 6/2013 | Hoshiba et al. | |

OTHER PUBLICATIONS

Amatucci, G. et al., "Fluoride based electrode materials for advanced energy storage devices", Journal of Fluorine Chemistry, 2007. 128(4): p. 243-262.

Cabana, J. et al., "Beyond Intercalation-Based Li-Ion Batteries: The State of the Art and Challenges of Electrode Materials Reacting Through Conversion Reactions", Advanced Energy Materials, 2010. 22(35): p. E170-E192.

USABC Goals for Advanced Batteries for EVs. 2002, United States Advanced Battery Consortium. http://www.uscar.org/commands/files_download.php?files_id=27.

Ohtomo, T. et al., "All solid-state lithium secondary batteries using the 75Li2S-25P2S5 glass an the 70Li2S-30P2S5 glass-ceramic as solid electrolytes", Journal of Power Sources 233 (2013) 231-235.

Wiers et al. "A Solid Lithium Electrolyte via Addition of Lithium Isopropoxide to a Metal-Organic Framework with Open Metal Sites," Journal of American Chemical Society, 2011, 133 (37), pp. 14522-14525.

Christensen et al., "A critical Review of Li/Air Batteries", Journal of the Electrochemical Society 159(2) 2012, R1-R30.

Supplementary European Search Report corresponding to European Patent Application No. 14 84 1088 (9 pages).

* cited by examiner

SOLID STATE BATTERY WITH OFFSET GEOMETRY

CROSS REFERENCE

This application claims the benefit of U.S. Provisional Application No. 61/870,269 filed Aug. 27, 2013, the entire contents of which is herein incorporated by reference.

FIELD OF THE DISCLOSURE

The present disclosure relates to batteries and more particularly to solid state batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

Batteries with a lithium metal negative electrode afford exceptionally high specific energy (in Wh/kg) and energy density (in Wh/L) compared to batteries with conventional carbonaceous negative electrodes. However, the cycle life of such systems is rather limited due to (a) significant volume changes in the cell sandwich during every cycle as the Li metal is stripped and plated, (b) formation of dendrites during recharge that may penetrate the separator and short the cell and/or result in fragmentation and capacity loss of the negative electrode; (c) morphology changes in the metal upon extended cycling that result in a large overall volume change in the cell; and (d) changes in the structure and composition of the passivating layer that forms at the surface of the metal when exposed to certain electrolytes, which may isolate some metal and/or increase the resistance of the cell over time.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co^{0.15}Al_{0.05}O_2$, $Li_{1.1}Ni_{0.3}Co_{0.03}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity for which some practical cycling has been achieved for a lithium-ion positive electrode is 1168 mAh/g (based on the mass of the lithiated material), which is shared by $Li_2S$ and $Li_2O_2$. Other high-capacity materials include $BiF_3$ (303 mAh/g, lithiated), $FeF_3$ (712 mAh/g, lithiated), $LiOH.H_2O$ (639 mAh/g), and others. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

Figure 1:
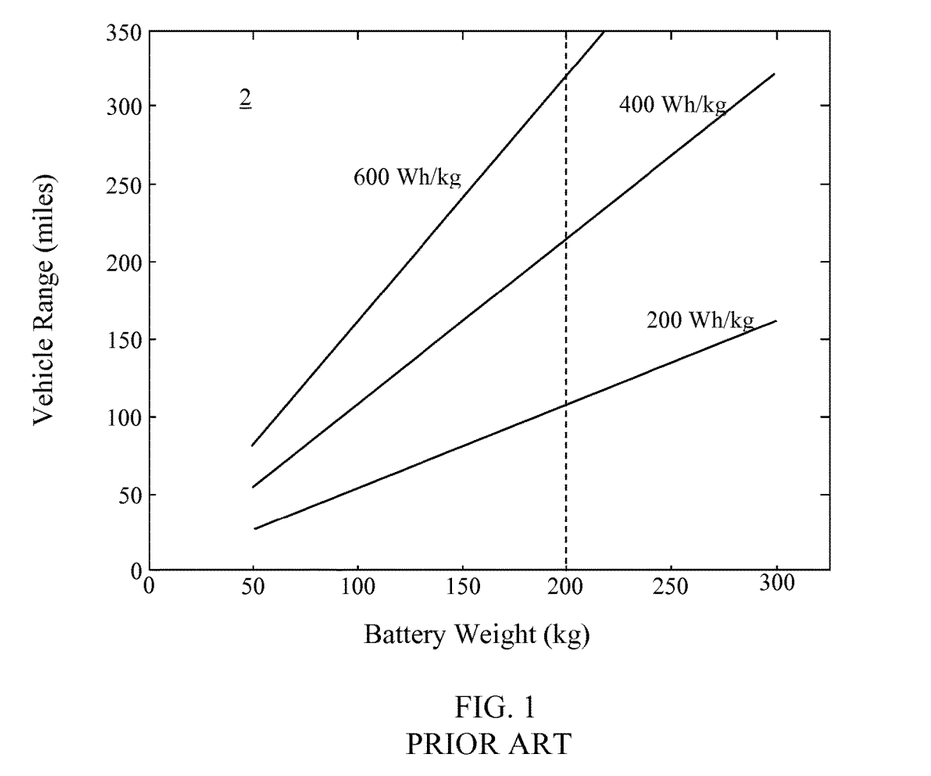
FIG. 1 depicts a plot showing the relationship between battery weight and vehicular range for various specific energies.

FIG. 1 depicts a chart 2 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Lithium-based batteries have a sufficiently high specific energy (Wh/kg) and energy density (Wh/L) that they are now being used in electric-powered vehicles. However, in order to power a full-electric vehicle with a range of several hundred miles, a battery with a higher specific energy than the present state of the art (an intercalation system with a graphite anode and transition-metal oxide cathode) is necessary.

Figure 2:
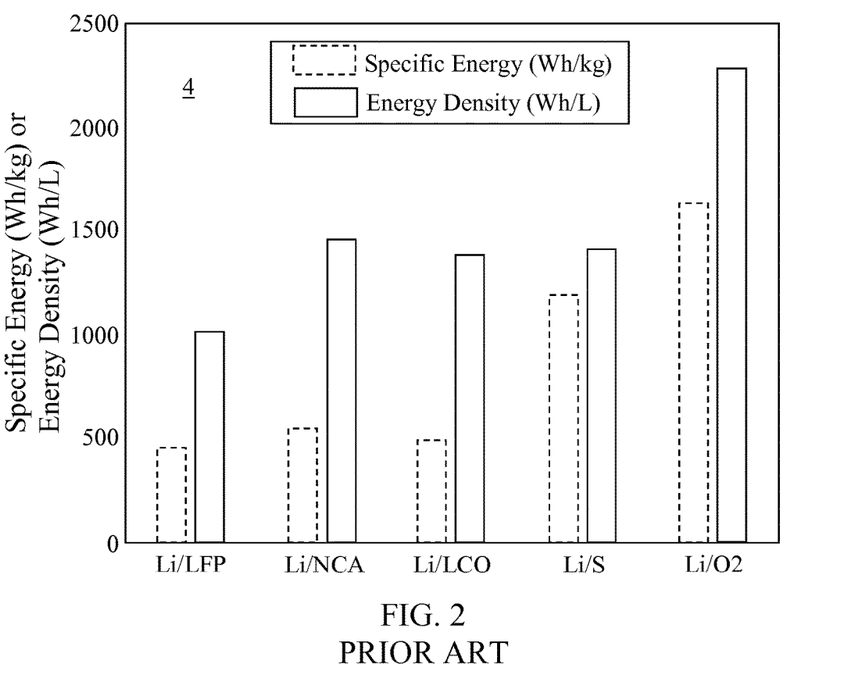
FIG. 2 depicts a chart of the specific energy and energy density of various lithium-based cells.

Some options which provide higher specific energy as compared to the currently utilized batteries are possible. For example, FIG. 2 depicts a chart 4 which identifies the specific energy and energy density of various lithium-based chemistries. In the chart 4, only the weight of the active materials, current collectors, binders, separator, and other inert material of the battery cells are included. The packaging weight, such as tabs, the cell can, etc., are not included. As is evident from the chart 4, the lithium-sulfur battery, which uses a lithium metal negative electrode and a positive electrode that reduces sulfur to form lithium sulfide, has a significantly higher specific energy than the present state of the art.

There are significant challenges that must be addressed for the lithium-sulfur system to become commercially viable. Important challenges include increasing the cycle life (current state of the art is 100 to several hundred cycles; target is >500, preferably >2000), increasing the utilization of sulfur (typical utilization is below 75% due to passivation of the positive electrode by $Li_2S$ or $Li_2S_2$, which are electronically insulating), increasing the mass fraction of sulfur in the positive electrode (typically the mass fraction is below 50%), and increasing the rate capability of the cell (target discharge rate is 1C or higher). While some Li/S cells described in the literature fulfill some of the objectives for cycle life, specific energy, and specific power, none of these cells adequately address all of the issues as would be needed to realize a commercial cell.

What is needed, therefore, is a solid state electrochemical cell which addresses one or more of the above identified issues.

SUMMARY

In accordance with one embodiment a solid state battery includes a first cell stack including a first solid-electrolyte separator positioned between a first cathode and a first anode, a first base layer including a first base portion positioned directly beneath the first anode, and including a first lateral extension extending laterally beyond the first anode, a second cell stack beneath the first base layer and including a second solid-electrolyte separator positioned between a second cathode and a second anode, a second base layer including a second base portion positioned directly beneath the second anode, and including a second lateral extension extending laterally beyond the second anode, wherein the second base portion extends laterally beyond the first lateral extension, and a multiplexor (i) in electrical communication with the first base portion through the first lateral extension, and (ii) in electrical communication with the second base portion through the second lateral extension.

In one or more embodiments, a battery includes a first insulator, the first insulator positioned above the first base portion and extending along a first side of the first anode, a second side of the first cathode, and a third side of the first separator, and a second insulator, the second insulator positioned above the second base portion and extending along a fourth side of the second anode, a fifth side of the second cathode, and a sixth side of the second separator.

In one or more embodiments, a battery includes a first conductive member extending upwardly from the first lateral extension, and a second conductive member extending upwardly from the second lateral extension, wherein the multiplexor is in electrical communication with the first base portion through the first lateral extension and the first conductive member, the multiplexor is in electrical communication with the second base portion through the second lateral extension and the second conductive member, and the second insulator is positioned between the first conductive member and the second conductive member.

In one or more embodiments the first conductive member is an upwardly extending portion of the first base layer, and the second conductive member is an upwardly extending portion of the second base layer.

In one or more embodiments the first conductive member is a first multiplexor lead, and the second conductive member is a second multiplexor lead.

In one or more embodiments the first cell stack has a first maximum thickness, the second cell stack has a second maximum thickness, and the first maximum thickness is larger than the second maximum thickness.

In one or more embodiments the first side, the second side, and the third side are perpendicular to an upper surface of the first base portion.

In one or more embodiments the first side, the second side, and the third side are not perpendicular to an upper surface of the first base portion.

In one or more embodiments the first cell stack is connected in series with the second cell stack.

In one embodiment, a method of forming a solid state battery includes providing a first cell stack including a first solid-electrolyte separator positioned between a first cathode and a first anode, positioning a first base portion of a first base layer directly beneath the first anode, the first base layer including a first lateral extension extending laterally beyond the first anode, providing a second cell stack including a second solid-electrolyte separator positioned between a second cathode and a second anode, positioning a second base portion of a second base layer directly beneath the second anode, the second base layer including a second lateral extension extending laterally beyond the second anode, such that the second base portion extends laterally beyond the first lateral extension, placing the first base portion in electrical communication with a multiplexor located above the first lateral extension through the first lateral extension, and placing the second base portion in electrical communication with the multiplexor through the second lateral extension.

In one or more embodiments a method of forming a solid state battery includes positioning a first insulator above the first base portion and along a first side of the first anode, a second side of the first cathode, and a third side of the first separator, and positioning a second insulator above the second base portion and along a fourth side of the second anode, a fifth side of the second cathode, and a sixth side of the second separator.

In one or more embodiments placing the first base portion in electrical communication with the multiplexor includes placing the first base portion in electrical communication with the multiplexor through a first conductive member extending between the first lateral extension and the multiplexor, placing the second base portion in electrical communication with the multiplexor includes placing the second base portion in electrical communication with the multiplexor through a second conductive member extending between the second lateral extension and the multiplexor, and positioning the second insulator includes positioning the second insulator between the first conductive member and the second conductive member.

In one or more embodiments placing the first base portion in electrical communication with the multiplexor includes placing the first base portion in electrical communication with the multiplexor through an upwardly extending portion of the first base layer, and placing the second base portion in electrical communication with the multiplexor includes placing the second base portion in electrical communication with the multiplexor through an upwardly extending portion of the second base layer.

In one or more embodiments providing the first cell stack includes providing the first cell stack with a first maximum thickness, providing the first cell stack includes providing the first cell stack with a first maximum thickness, and the first maximum thickness is larger than the second maximum thickness.

In one or more embodiments positioning the first insulator includes positioning the first insulator along portions of the first side, the second side, and the third side which are perpendicular to an upper surface of the first base portion.

In one or more embodiments positioning the first insulator includes positioning the first insulator along portions of the first side, the second side, and the third side which are not perpendicular to an upper surface of the first base portion.

In one or more embodiments a method of forming a solid state battery includes connecting the first cell stack in series with the second cell stack with the multiplexor.

In one or more embodiments placing the first base portion in electrical communication with the multiplexor includes placing the first base portion in electrical communication with the multiplexor through a first multiplexor lead extending between the first lateral extension and the multiplexor, and placing the second base portion in electrical communication with the multiplexor includes placing the second base portion in electrical communication with the multiplexor through a second multiplexor lead extending between the second lateral extension and the multiplexor.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 3:
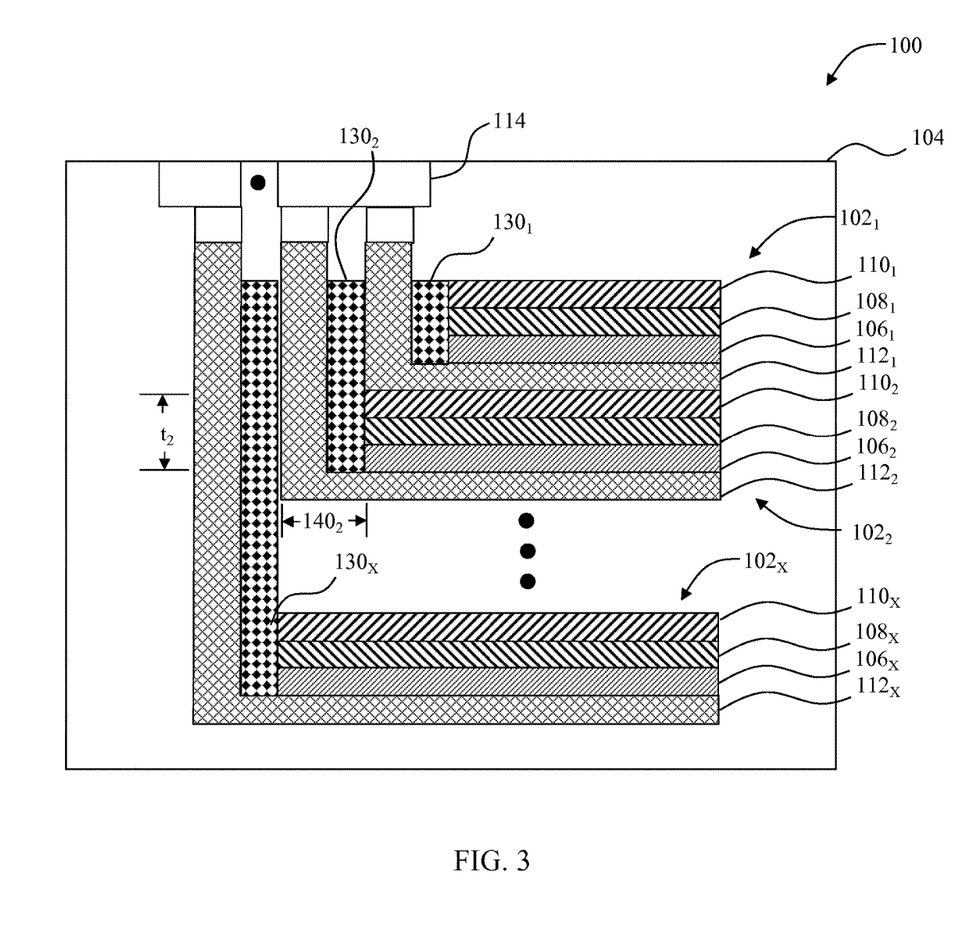
FIG. 3 depicts a simplified cross sectional view of a stacked battery with a bipolar design that includes offset base layers in a stepped geometry.

FIG. 3 depicts an electrochemical battery 100. The electrochemical battery 100 includes a number of cells or cell stacks $102_X$ within a packaging 104 or other surrounding environment that is both electrically insulating and (optionally) thermally conductive. The packaging 104 improves the safety of the electrochemical battery 100.

Each of the cells $102_X$ includes an anode $106_X$, a separator $108_X$, and a cathode $110_X$. A base layer $112_X$, which is typically metal such as copper and can serve as a current collector as well as a feedthrough to an integrated circuit or multiplexor 114, is positioned adjacent to the anode $106_X$ and between the anode $106_X$ and an adjacent cathode. For example, the base layer $112_1$ is located between the anode $106_1$ and the cathode $110_2$.

While the multiplexor 114 is depicted within the packaging 104, in some embodiments the multiplexor 114 is provided external to the packaging 104. The multiplexer 114 may be a solid-state device with insulating material between the electronic leads. The leads of the multiplexer which contact each terminal of the cell stack may extend to the top of the cell to an electrical circuit used for monitoring and controlling the current through each of the leads.

The anodes $106_X$ include lithium metal or a lithium alloy metal. The anodes $106_X$ are sized such that they have at least as much capacity as the associated cathode $110_X$, and preferably at least 10% excess capacity and up to greater than 50% capacity in some embodiments.

The cathodes $110_X$ in various embodiments include a sulfur or sulfur-containing material (e.g., PAN-S composite or $Li_2S$); an air electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials, or blends thereof or any other active material or blend of materials that react with and/or insert Li cations and/or electrolyte anions. The cathodes $110_X$ may be fully dense. The cathodes $110_X$ may include Li-conducting polymer, ceramic or other solid, non-polymer electrolyte.

The cathode Li-insertion materials may additionally be coated (e.g., via spray coating) with a material such as $LiNbO_3$ in order to improve the flow of ions between the Li-insertion materials and the solid-electrolyte, as described in T. Ohtomo et al., Journal of Power Sources 233 (2013) 231-235. Solid-electrolyte materials in the cathodes $110_X$ may further include lithium conducting garnets, lithium conducting sulfides (e.g., $Li_2S$—$P_2S_5$) or phosphates, $Li_3P$, LIPON, Li-conducting polymer (e.g., PEO), Li-conducting metal-organic frameworks such as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference, thio-LISiCONs, Li-conducting NaSICONs, $Li_{10}GeP_2S_{12}$, lithium polysulfidophosphates, or other solid Li-conducting material. Other solid-electrolyte materials that may be used are described in Christensen et al., "A critical Review of Li/Air Batteries", Journal of the Electrochemical Society 159(2) 2012, the entire contents of which are herein incorporated by reference. Other materials in the cathodes $110_X$ may include $Li_{7-x}La_3Ta_xZr_{2-x}O_{12}$, wherein 0≤X≤2, electronically conductive additives such as carbon black, and a binder material. The cathode materials are selected to allow sufficient electrolyte-cathode interfacial area for a desired design.

Figure 4:
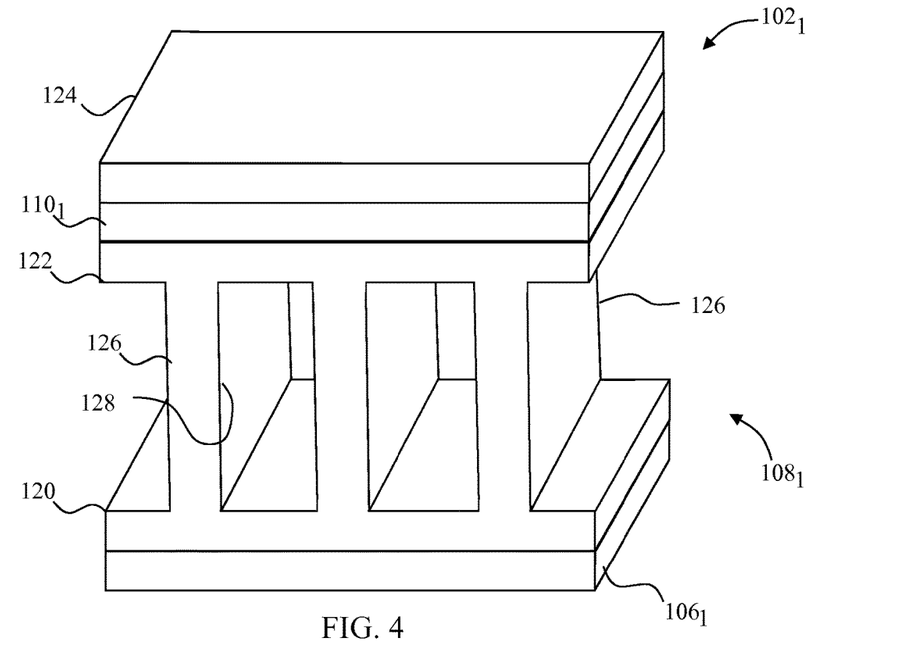
FIG. 4 depicts a partial side perspective view of one of the cells of FIG. 3 showing a separator with an open cell microstructured composite separator with solid-electrolyte components in the form of columns which inhibits dendrite formation while allowing flexing of the anodes.

In some embodiments, the separators $108_X$ are microstructured composite separators which conduct lithium ions between the anodes $106_X$ and the cathodes $110_X$ while blocking electrons. For example, FIG. 4 depicts a partial perspective view of the cell $102_1$ which includes a layer 120 adjacent to the anode $106_1$ and a layer 122 adjacent to the cathode $110_1$. A current collector 124 is also shown which may be made of aluminum and is provided in some embodiments, and may be separated from an adjacent base layer $112_X$ by a layer of electrically conductive but chemically inactive material such as graphite. A number of solid-electrolyte components in the form of columns 126 extend between the layer 120 and the layer 122 defining microstructure cavities 128 therebetween.

The microstructured composite separator $108_X$ thus consists of regularly spaced solid-electrolyte components 126 which provide sufficient ionic transport (i.e., by providing a sufficiently high volume fraction of conducing material and by limiting the thickness of the structure between the anode and cathode) and provide mechanical resistance to suppress the formation and growth of lithium dendrites in the anode $106_X$. In the embodiment of FIG. 4, solid-electrolyte components $108_X$ are flexible so as to accommodate volume change of the electrodes.

While three columns 126 are shown in FIG. 4, there are more or fewer solid-electrolyte components in other embodiments. In other embodiments, the solid-electrolyte components may be configured in other forms. In some embodiments, the microstructure cavities 128 may be filled with different compositions to provide a desired flexibility and/or to otherwise modify mechanical properties of the microstructured composite separator. More details regarding the microstructured composite separator $108_X$, and other alternative separator configurations, are provided in U.S. application Ser. No. 14/460,798, filed Aug. 15, 2014, the entire contents of which are herein incorporated by reference.

By stacking the cells $102_X$ in the bipolar design of FIG. 3, the operating voltage of the battery 100 can be modified to the desired voltage. By way of example, if each cell $102_X$ has an operating voltage of ~4 V, 100 cells $102_X$ can be stacked to produce a device that has an operating voltage of ~400 V. In this way, a given power can be achieved while passing a low current through each of the cells $102_X$. Therefore, wiring of the cells $102_X$ can be achieved with small-diameter electrical conductors while maintaining high energy efficiency. The battery 100 thus provides an operating voltage greater than 5 V, and in some embodiments, greater than 50 V.

Returning to FIG. 3, the electrochemical battery 100 further includes a plurality of insulators $130_X$. The insulators $130_X$ insulate the cells $102_X$ from the upwardly extending base layer $112_X$. In order to provide sufficient space for the upwardly extending portions of the base layers $112_X$ and the insulators $130_X$, the cells $102_X$ are "offset". As used herein, "offset" means that the base layer $112_X$ has a lateral extent (for the orientation of FIG. 3) which is greater than the associated anode $106_X$, separator $108_X$, and cathode $110_X$ on at least one side of the cell $102_X$ as shown in FIG. 3. For example, the offset for cell $102_2$ is identified as offset $140_2$.

The offset $140_X$ which in the embodiment of FIG. 3 is a "step-edge" geometry, allows for independent monitoring and control of the cell sandwiches that comprise a high-voltage stack. In an offset geometry, either the positive terminal and/or negative terminal of each cell sandwich or group of cell sandwiches is exposed and can be contacted electrically by a multiplexer or multichannel circuit. In some embodiments only one terminal is exposed; in others both terminals are exposed; in still others the electronically conductive bipolar plate is exposed. Preferably, the geometry of the stack is such that the offset is greater than the thickness (t), of the respective anode $106_X$, separator $108_X$, and cathode $110_X$.

The offset $140_X$ provides connection to each cell $102_X$ from above rather than from the side. This type of connection is easier to achieve. For instance, a given cell $102_X$ may be only 2 to 5 microns thick but the steps or offsets $140_X$ may have a length of 10 microns. For a cell stack consisting of 100 cell sandwiches, the total length of the offsets $140_X$ would be approximately 1 mm. Hence, if the cell area is 10 cm×10 cm, then the difference in area between the top most cell sandwich and the bottom most cell sandwich is only 1%. In some embodiments, the difference in the lengths of the individual cells $102_X$ is compensated by making the electrode regions with different thicknesses such that the total capacity of each of the cells $102_X$ is identical.

Embodiments described herein thus provide for monitoring and control of the cells $102_X$ individually or in groups of serially connected cells. This allows, for example, bypassing a defective cell as well as active and/or passive cell balancing. Active cell balancing includes charging one or more cells $102_X$ or groups of cells $102_X$ while discharging one or more other cells $102_X$ or groups of cells $102_X$, such that the energy flows from the discharged cells $102_X$ to the charged cells $102_X$. Passive cell balancing includes the use of a shunt such that a cell $102_X$ that is deemed to be fully charged or fully discharged can be bypassed.

Figure 5:
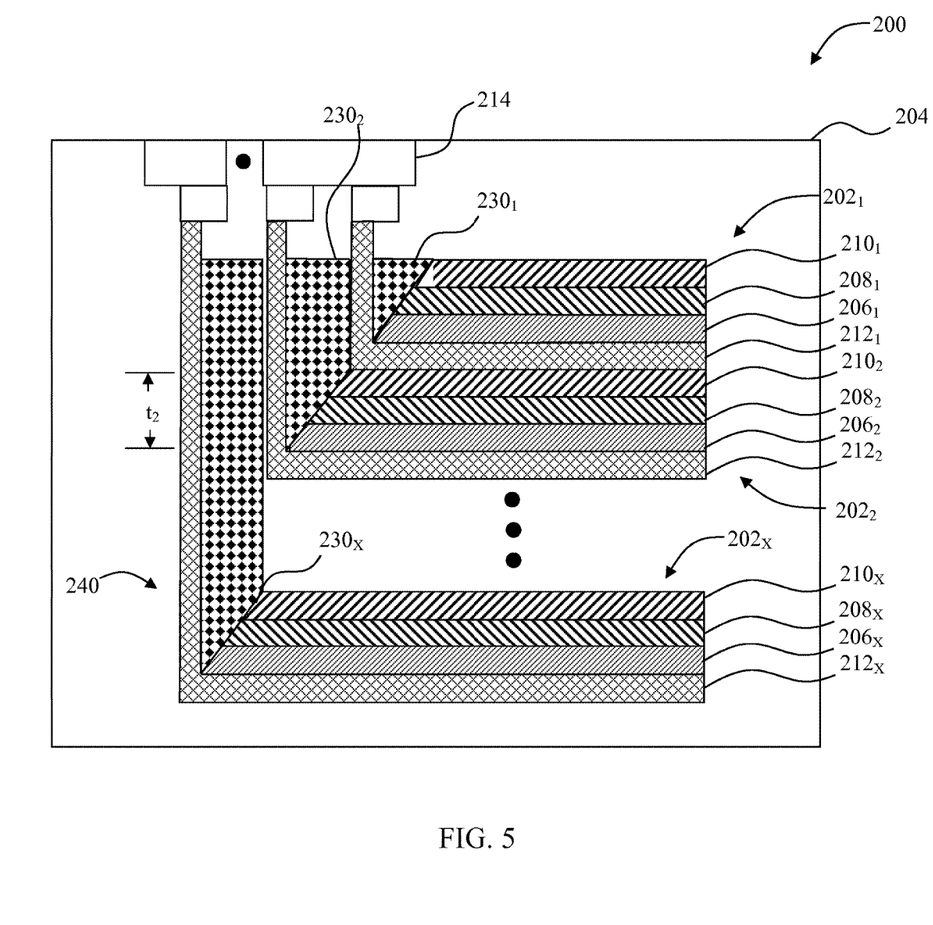
FIG. 5 depicts a simplified cross sectional view of a stacked battery with a bipolar design that includes offset base layers in an angled geometry.

While the offsets $140_X$ are depicted in a stepped geometry, other configurations are used in other embodiments. By way of example, FIG. 5 depicts a battery 200 which includes a packaging 204 and a number of cells $202_X$, each of which is substantially the same as the cells $102_X$ including anodes $206_X$, separators $208_X$, cathodes $210_X$ and base layers $212_X$. The cells $202_X$ are connected to a multiplexor 214 and insulators $230_X$ are provided at the ends of the cells $202_X$.

The main difference between the cells $102_X$ and the cells $202_X$ is that the ends of the anodes $206_X$, separators $208_X$, cathodes 210X adjacent to the offsets $240_X$ are angled thereby providing an "angled" geometry which can make connection to the cells $202_X$ simpler.

Figure 6:
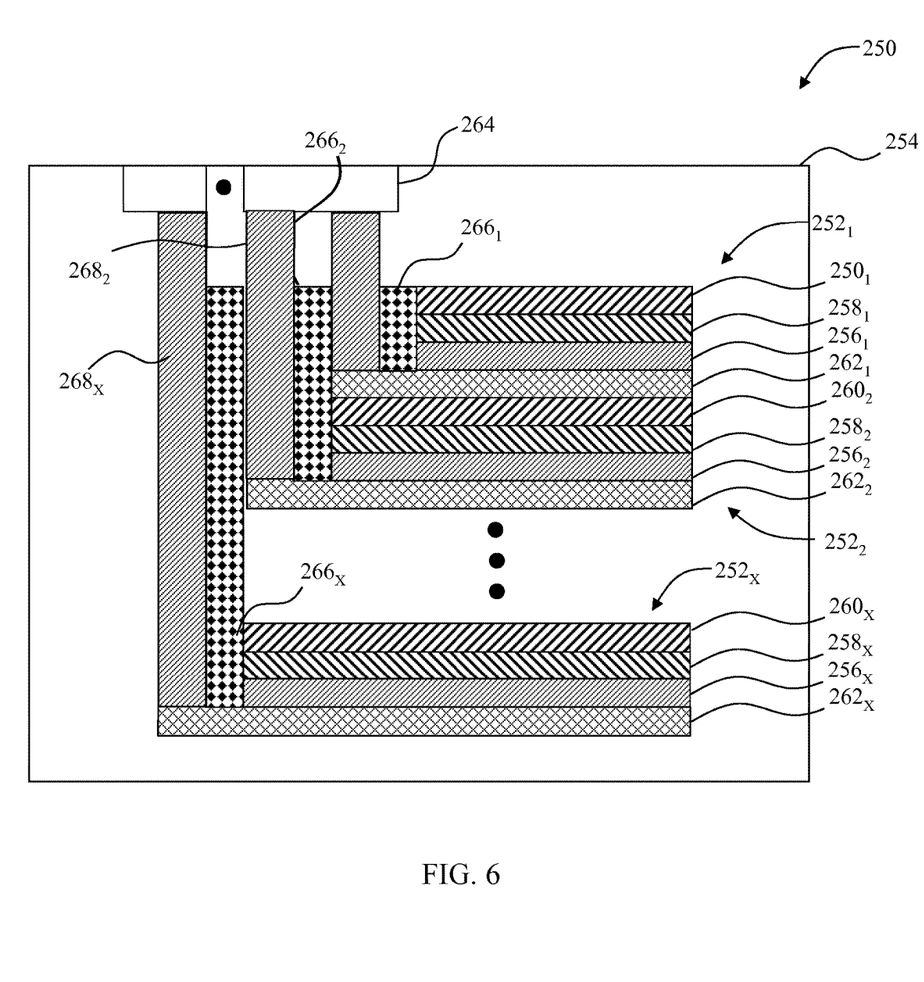
FIG. 6 depicts a simplified cross sectional view of a stacked battery with a bipolar design that includes offset base layers in a stepped geometry with leads from a multiplexor that extend down to base layers.

FIG. 6 depicts a battery 250 which includes a packaging 254 and a number of cells $252_X$, each of which is substantially the same as the cells $102_X$ including anodes $256_X$, separators $258_X$, cathodes $260_X$ and base layers $262_X$. The cells $252_X$ are connected to a multiplexor 264 and insulators $266_X$ are located at the ends of the cells $250_X$. The main difference between the battery 250 and the battery 100 is that the multiplexor 264 includes leads 268 which extend downwardly to the base layers $262_X$.

The above described embodiments provide a solid-state battery, cell, or cell stack with high operating voltage enabled by many cell sandwiches connected in series and contained within the same package. The cell stack in some embodiments has a staircase structure on at least one edge in order to enable independent electrical contact to each cell sandwich. Hence, individual cell sandwiches can be bypassed or monitored and controlled independently, and both passive and active cell sandwich balancing can be enabled.

The above described embodiments thus provide a safe energy-storage system with high voltage enabled by multiple cell sandwiches stacked in series and an electronically insulating material or medium surrounding the cell stack or incorporated into the cell packaging.

The offset design in some embodiments enables independent monitoring and control of each cell sandwich, bypassing of defective cell sandwiches, active and/or passive cell balancing.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A solid state battery, comprising:
   a first cell stack including a first solid-electrolyte separator positioned between a first cathode and a first anode;
   a first base layer including a first base portion positioned directly beneath the first anode, and including a first lateral extension extending laterally beyond the first anode;
   a second cell stack beneath the first base layer and including a second solid-electrolyte separator positioned between a second cathode and a second anode;
   a second base layer including a second base portion positioned directly beneath the second anode, and including a second lateral extension extending laterally beyond the second anode, wherein the second base portion extends laterally beyond the first lateral extension; and
   a multiplexor (i) in electrical communication with the first base portion through the first lateral extension, and (ii) in electrical communication with the second base portion through the second lateral extension.

2. The battery of claim 1, further comprising:
   a first insulator, the first insulator positioned above the first base portion and extending along a first side of the first anode, a second side of the first cathode, and a third side of the first separator; and
   a second insulator, the second insulator positioned above the second base portion and extending along a fourth side of the second anode, a fifth side of the second cathode, and a sixth side of the second separator.

3. The battery of claim 2, further comprising:
a first conductive member extending upwardly from the first lateral extension; and
a second conductive member extending upwardly from the second lateral extension, wherein:
the multiplexor is in electrical communication with the first base portion through the first lateral extension and the first conductive member;
the multiplexor is in electrical communication with the second base portion through the second lateral extension and the second conductive member; and
the second insulator is positioned between the first conductive member and the second conductive member.

4. The battery of claim 3, wherein:
the first conductive member is an upwardly extending portion of the first base layer; and
the second conductive member is an upwardly extending portion of the second base layer.

5. The battery of claim 3, wherein:
the first conductive member is a first multiplexor lead; and
the second conductive member is a second multiplexor lead.

6. The battery of claim 3, wherein:
the first cell stack has a first maximum thickness;
the second cell stack has a second maximum thickness; and
the first maximum thickness is larger than the second maximum thickness.

7. The battery of claim 3, wherein the first side, the second side, and the third side are perpendicular to an upper surface of the first base portion.

8. The battery of claim 3, wherein the first side, the second side, and the third side are not perpendicular to an upper surface of the first base portion.

9. The battery of claim 3, wherein the first cell stack is connected in series with the second cell stack.

10. The solid state battery of claim 2, further comprising:
a packaging, wherein the first cell stack, the first base layer, the second cell stack, the second base layer, the first insulator, and the second insulator are each located within the packaging.

11. The solid state battery of claim 10, wherein the multiplexor is located within the packaging.

* * * * *